United States Patent [19]

Stava

[11] 4,097,166
[45] Jun. 27, 1978

[54] LATCH FOR FILM CARTRIDGE

[75] Inventor: Reid J. Stava, Fairport, N.Y.

[73] Assignee: The Singer Company, New York, N.Y.

[21] Appl. No.: 724,882

[22] Filed: Sep. 20, 1976

[51] Int. Cl.² .............................................. B25G 3/18
[52] U.S. Cl. .................................... 403/321; 352/72; 403/327
[58] Field of Search ............... 403/321, 323, 315, 316, 403/317, 324, 325, 327, 330; 352/72; 292/341.13

[56] References Cited

U.S. PATENT DOCUMENTS

| | | | |
|---|---|---|---|
| 3,551,038 | 12/1970 | Bundschuh et al. | 352/72 |
| 3,675,992 | 7/1972 | Winkler et al. | 352/72 |
| 3,702,726 | 11/1972 | Takeichi et al. | 352/72 |
| 3,811,758 | 5/1974 | Riedel | 352/74 X |
| 3,892,477 | 7/1975 | Land | 352/72 X |
| 3,967,886 | 7/1976 | Komine et al. | 352/72 X |

Primary Examiner—Wayne L. Shedd
Attorney, Agent, or Firm—Charles R. Lewis

[57] ABSTRACT

A latch for positively retaining a cartridge or similar article to a complimentary cartridge utilizing structure. The latch includes a rotatably mounted plate having upstanding latch pins thereon. A tab extends laterally from each latch pin to engage complimentary apertures formed in the cartridge.

8 Claims, 4 Drawing Figures

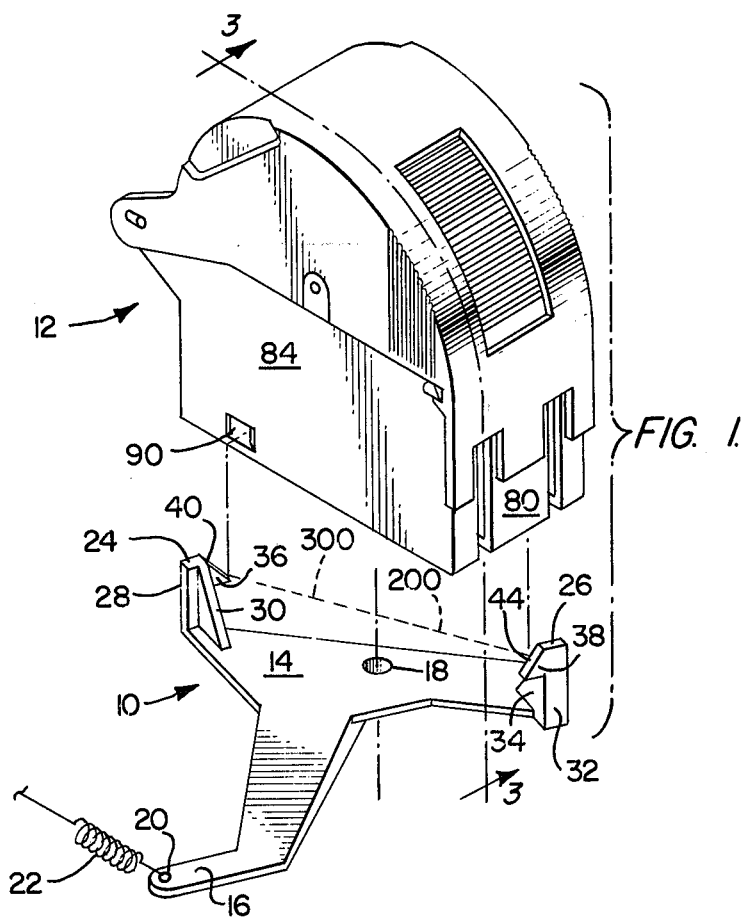
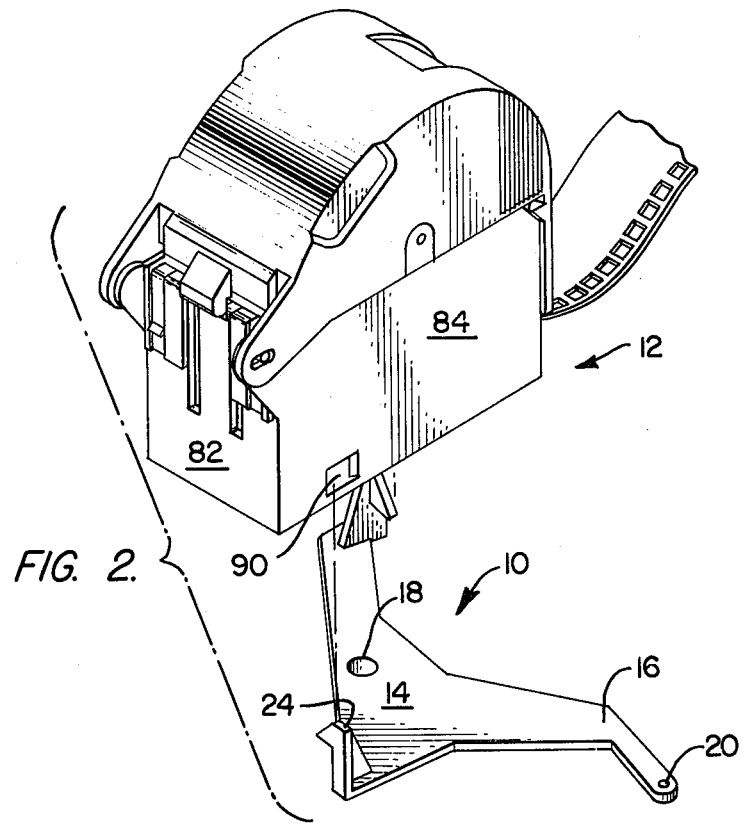

LATCH FOR FILM CARTRIDGE

BACKGROUND OF THE INVENTION

1. Field of the invention

The present invention relates to latches of the type having latch pins designed to positively engage complimentary apertures in a cartridge or similar article.

2. Description of the prior art

Cartridges of the type designed to hold photographic film for operating engagement with photographic equipment have enjoyed widespread use. Usually, a latch means is utilized to maintain the cartridge in operating engagement with the photographic equipment.

Many conventional latches locate a spring biased roller on the photographic equipment to engage a complimentary notch on the cartridge. Such latches provide adequate latching forces for many applications. However, where the photographic equipment is operated under a variety of physical orientations, e.g. upside down, or under conditions of acceleration and vibration, such latches may not provide adequate latching forces, causing the cartridge to disengage from the photographic equipment.

The present invention provides a latch for positively retaining a cartridge to a cartridge utilizing structure and holding the cartridge in place.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein:

FIG. 1 is an exploded front perspective view of a latch and a complimentary cartridge;

FIG. 2 is an exploded rear perspective view of the latch and cartridge shown in FIG. 1;

DETAILED DESCRIPTION OF THE PREFERRED EMBODIMENT

Figure 3:
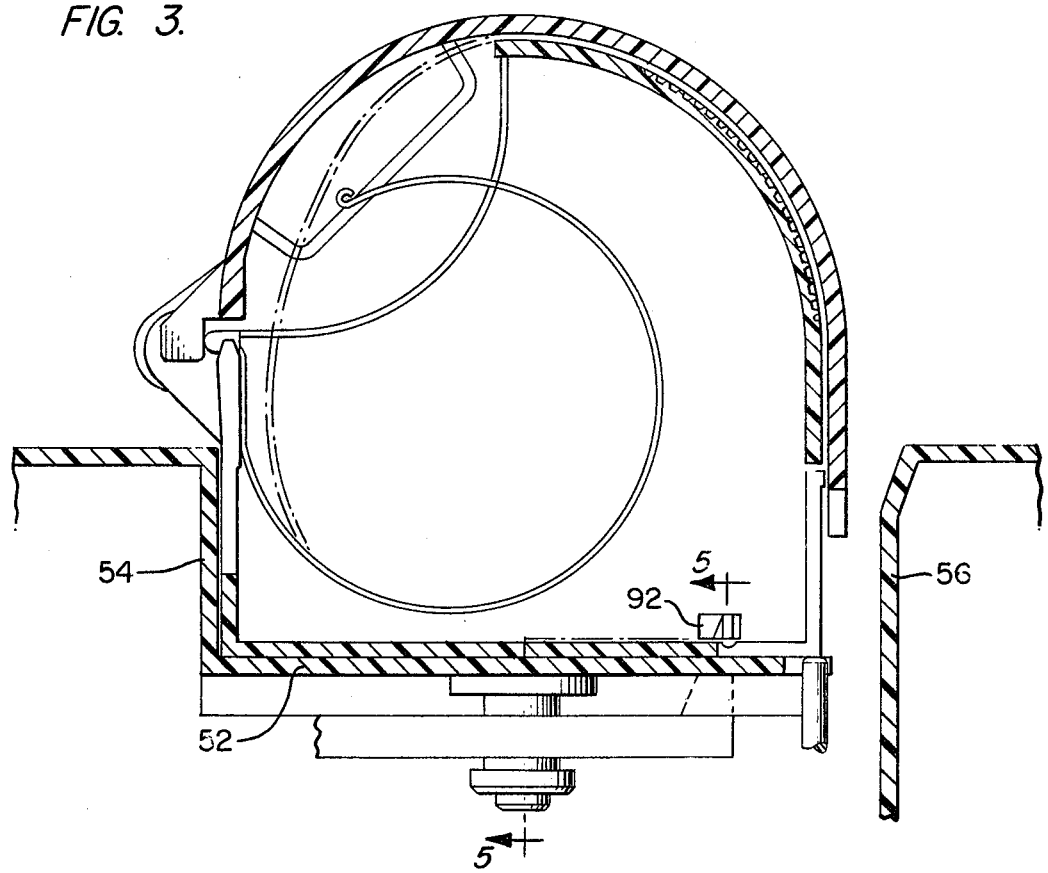
FIG. 3 is a side elevation cross section view of the cartridge and latch in the latched position; taken along line 3—3 of FIG. 1.

A latch 10 in accordance with the present invention is shown in exploded perspective with a film strip cartridge 12 in FIGS. 1 and 2. The latch 10 is preferably molded from a plastic material using mass production techniques to produce a low cost component. The latch 10 is suitable for use in a film strip projector of the type described in copending patent application Ser. No. 724,881, filed Sept. 20, 1976, and with a film strip cartridge of the type shown in FIG. 1 and FIG. 2 and described in co-filed patent application Ser. Nos. 724,875 filed Sept. 20, 1976, and 724,875 filed Sept. 20, 1976. The disclosure of the above applications is incorporated herein by reference. The operative relation of the latch 10 to the strip film cartridge 12 as described herein is merely one example of the latch 10 utility. The latch 10 may be utilized to latch many types of cartridges, cassettes, magazines, and containers.

The latch 10 includes a plate portion 14 and an integrally formed lever portion 16 extending outwardly from and in the same plane as the plate portion 14. The plate portion 14 has a mounting bore 18 formed therein to facilitate rotatable mounting of the latch 10 on the projector structure as described below. The distal end of the lever portion 16 has a hole 20 formed therein to receive one end of a force bias spring 22 (FIG. 1).

Two latch pins, 24 and 26, are located at opposite ends of the plate portion 14. The latch pins 24 and 26 are preferably integrally formed with the latch 10. The latch 24 is formed by the intersection of ribs 28 and 30. Likewise, the latch pin 26 is formed by the intersection of ribs 32 and 34.

Figure 4:
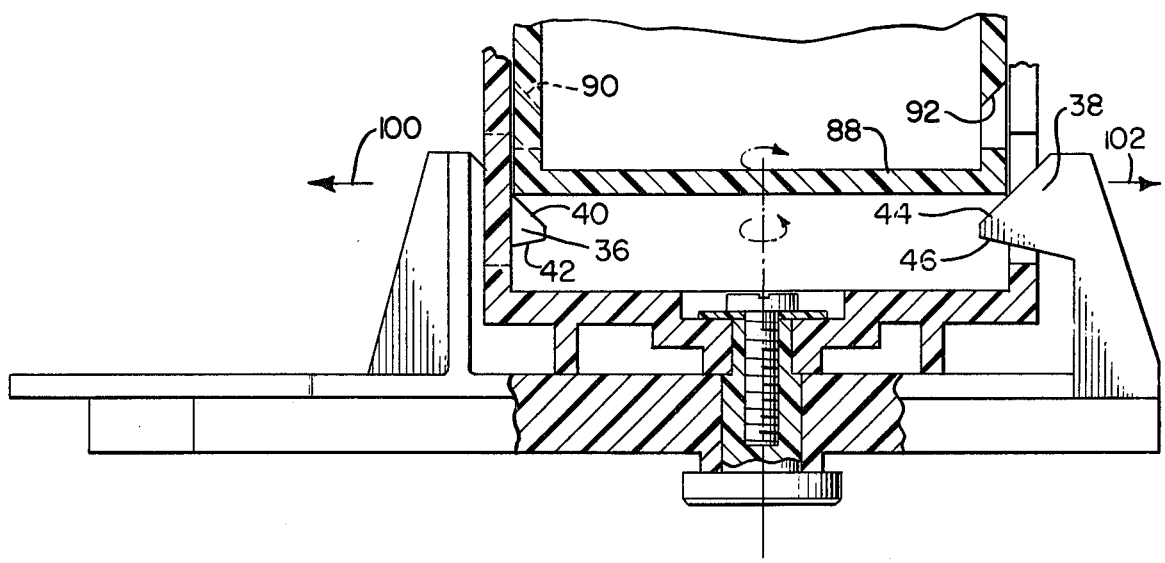
FIG. 4 is a partial front cross section view of the cartridge and latch of FIG. 3.

A tab 36 extends laterally outward from the distal end of the latch pin 26 and a tab 38 extends laterally outward from the distal end of the latch pin 24. As best seen in FIG. 4, the tab 36 has a ramp surface 40, and a lock surface 42 converging at an apex. In a like manner, the tab 38 has a ramp surface 44 and a lock surface 46 converging at an apex to define a formation identical to tab 36. As shown in FIG. 1 and FIG. 2, the latch pin 24 and the latch pin 26 are preferably positioned on the plate portion 14 at an equal distance from the mounting bore 18, and the tab 36 and the tab 38 are oriented in generally parallel but opposite directions. Tab orientations and latch pin positions other than those disclosed in the preferred embodiment are acceptable.

Figure 5:
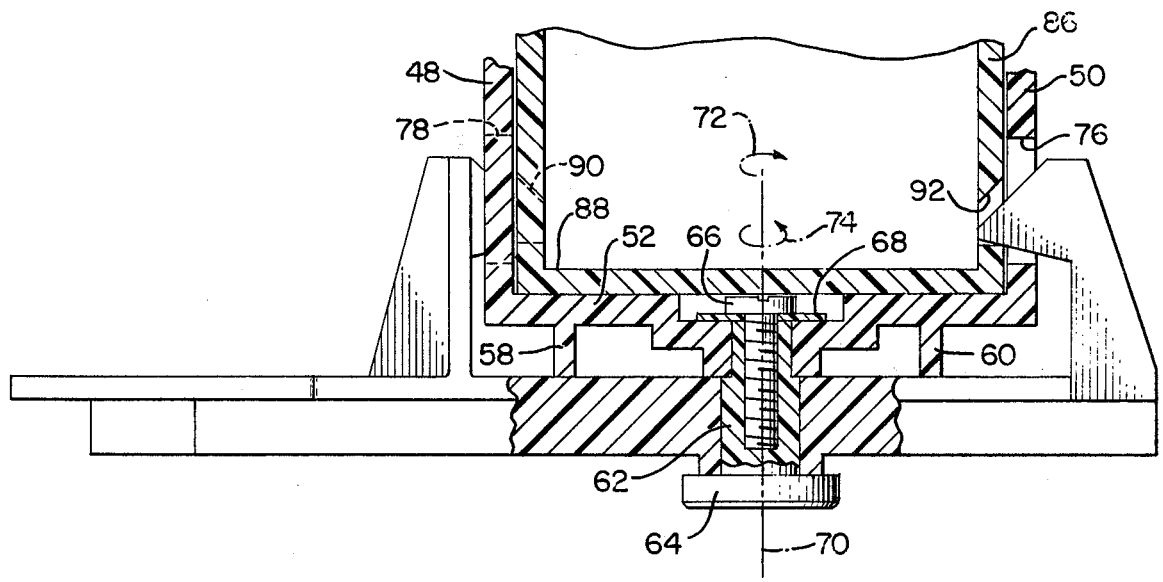
FIG. 5 is a partial front cross section view of the cartridge and latch of FIG. 3 taken along line 5—5.

An exemplary mounting for the latch 10 in a film strip projector enviornment is shown in cross section view in FIGS. 3, 4, and 5. A cavity, adapted to receive the cartridge 12 shown in FIG. 1 and FIG. 2, is defined by a sidewall 48, a sidewall 50, a bottom wall 52, a rear wall 54, and a forward wall 56. A boss 58 and a boss 60 depend from the bottom wall 52 to provide a bearing surface for the moveably mounted latch 10.

A bushing 62, having an enlarged head 64 at its lower end, is disposed in the mounting bore 18 of the latch 10 and in a hole formed in the bottom wall 52 of the cavity. A threaded fastener 66 and a washer 68 retain the bushing 62 and the latch 10 in place. The latch 10 is rotatable about an axis 70 in a first direction as indicated by the arrow 72 and in a second direction as indicated by the arrow 74. The sidewall 50 has an access port 76 formed therein to allow the tab 38 to project into the cavity. Likewise, the sidewall 48 has an access port 78 (shown in phantom) formed therein to allow the tab 36 to project into the cavity. When the latch 10 is rotated about the axis 70 in the direction of arrow 72, the tab 36 and the tab 38 project thru the access ports 78 and 76 into the cavity and assume the position shown in FIG. 4 and FIG. 5. Conversely, when the latch 10 is rotated in the direction of arrow 74, the tab 36 and the tab 38 are rotated out of the access ports 76 and 78. The latch 10 is preferably biased to rotate in the direction arrow 72 by means of the spring 22 (FIG. 1). One end of the spring 22 is secured to the hole 20 in the distal end of the lever portion 16, and the other end of the spring 22 is secured to a point on the projector structure (not shown).

The lower portion of the cartridge 12, shown in exploded relation with the latch 10 in FIG. 1 and FIG. 2, is formed as a parallelepiped with a forward wall 80, a rear wall 82, a sidewall 84, another coplanar sidewall 86 (FIG. 4), and a bottom 88 (FIG. 4). The cartridge 12 is sized to be received in the projector cavity described above. An aperture 90 is formed in the sidewall 84 toward the rear of the cartridge 12 (FIG. 1 and FIG. 2), and another aperture 92 (FIG. 3) is formed in the sidewall 86 toward the front of the cartridge 12. When the cartridge 12 is inserted into the projector cavity as described below, the aperture 90 is in registration with the access port 78 formed in the cavity sidewall 48. Likewise, the aperture 92 will be in registration with the access port 76 formed in the cavity sidewall 50.

The sequence of cartridge 12 insertion and latching is represented by FIG. 4 and FIG. 5. In FIG. 4 the cartridge 12 has been inserted into the projector cavity with the lower left edge of the cartridge 12 contacting the ramp surface 40 of the tab 36 and the lower right edge of the cartridge 12 contacting ramp surface 44 of the tab 38. A downward force on the cartridge 12 will cause forces to develop at the, line, or area of contact between the lower edges of the cartridge 12 and the ramp surfaces 40 and 44. The arrow 100 represents a lateral component of the forces developed at the line, or area of contact between the lower left edge of the cartridge 12 and the ramp surface 40 of the tab 36. The arrow 102 represents a lateral component of the forces developed at the line, or area of contact between the lower right edge of cartridge 12 and the ramp surface 44 of the tab 38.

The force 100 will lie parallel to the plate portion 14 and in a direction perpendicular to a moment arm between the axis of rotation and the ramp surface 40 of the tab 36. The moment arm is represented by the broken line 200 in FIG. 1. In a like manner, the force 102, will lie parallel to the plate portion 14 and in a direction perpendicular to the moment arm between the axis of rotation 70 and the ramp surface 34 of the tab 38. This moment arm is represented by the broken line 300 in FIG. 1. The forces 100 and 102 in combination with the movement arms 200 and 300, respectively, will cause a moment of force, viz., a torque, to develop which will rotate the latch about the axis 70 in the direction of arrow 74. As the cartridge 12 is pushed into the cavity, the tabs 36 and 38 will be forced out of the cavity to allow the cartridge 12 to seat in the cavity. When the cartridge 12 is full seated in the cavity as illustrated in FIG. 5, the bias force supplied by the spring 22 causes the latch 10 to rotate about its axis 70 in the direction of the arrow 72 to cause the tab 36 to enter the aperture 90 and the tab 38 to enter the aperture 92. The cartridge 12 is thus securely latched into the projector cavity by one straight line motion by the projector operator. The cartridge 12 is securely latched into place and remains in place in spite of vibration or operation of the projector at various orientations.

As shown in FIG. 4, the locking surface 42 of the tab 36 and the locking surface 46 of the tab 38 are inclined to the plane of bottom wall 88 of the cartridge 12. This inclination allows locking surfaces 42 and 46 to adapt to the cartridges having different sized apertures 90, and 92. Changes in the size or shape of the apertures can occur thru warpage of the cartridge 12 or wear.

The cartridge 12 may be unlatched and removed from the cavity by rotating the latch 10 about the axis 70 in the direction of arrow 74. As the latch 10 rotates, the tabs 38 and 36 move out of engagement with the cartridge 12 thereby permitting the cartridge 12 to be lifted out of the cavity. In order to rotate the latch 10, one end of a controlling link (not shown) or a control wire (not shown) may be pivotally connected to the distal end of the lever portion 16. The other end of the control link or wire then terminates with a projector operator manipulatable control.

As described above, the present invention provides a latch for positively engaging a cartridge to a cartridge utilizing structure and holding the cartridge in place under a variety of physical orientations, or under conditions of acceleration and vibration.

As will be apparent to those skilled in the art, various changes and modifications may be made to the preferred embodiment of the invention described herein without departing from the scope of the claimed invention.

I claim:

1. A latch detachably engageable with a film strip cartridge of the type having at least a pair of side walls and an aperture in each of said side walls comprising:
   a plate portion rotatably supported on a support means and having an axis of rotation substantially normal to the plate;
   a first tab located on a first area of said plate;
   a second tab located on a second area of said plate, opposite from said first area;
   said tabs facing in opposite directions;
   at least first and second spaced, opposed, parallel walls defining a cartridge restraint means;
   said first sidewall having a first access port for said first tab;
   said second sidewall having a second access port for said second tab;
   whereby rotation of said plate portion in a first direction causes said first tab to enter said first access port, and said second tab to enter said second access port;
   and rotation of said plate portion in the second direction, opposite from said first direction, causes said first tab to retract from said first access port, and said second tab to retract from said second access port.

2. The latch claimed in claim 1, further comprising;
   a resilient spring biasing means to resiliently urge said plate portion to rotate in said first direction.

3. The latch claimed in claim 1, wherein
   said tabs have a ramp surface and a lock surface.

4. The latch claimed in claim 3, wherein
   said ramp surface and said lock surface are inclined toward one another.

5. A latch detachably engageable with a film strip cartridge of the type having at least a pair of sidewalls and an aperture in each of said side walls comprising:
   a plate portion rotatably supported on a support means and having an axis of rotation substantially normal to the plate;
   a first latch pin located on a first area of said plate;
   a second latch pin located on a second area of said plate, opposite from said first area;
   a tab extending laterally outward from each latch pin;
   said tabs facing in opposite directions;
   at least first and second spaced, opposed, parallel walls defining a cartridge restraint means;
   said first sidewall having a first access port for said first tab;
   said second sidewall having a second access port for said second tab;
   whereby rotation of said plate portion in a first direction causes said first tab to enter said first access port, and said second tab to enter said second access port;
   and rotation of said plate portion in the second direction, opposite from said first direction, causes said first tab to retract from said first access port, and said second tab to retract from said second access port.

6. The latch claimed in claim 5, further comprising;
a resilient spring biasing means to resiliently urge said plate portion to rotate in said first direction.
7. The latch claimed in claim 5, wherein said tabs have a ramp surface and a lock surface.
8. The latch claimed in claim 7, wherein said ramp surface and said lock surface are inclined toward one another.

* * * * *